Nov. 10, 1936.   M. G. CHANDLER   2,060,034
BONDED METAL BEARINGS AND METHOD OF MAKING THE SAME
Filed June 22, 1933
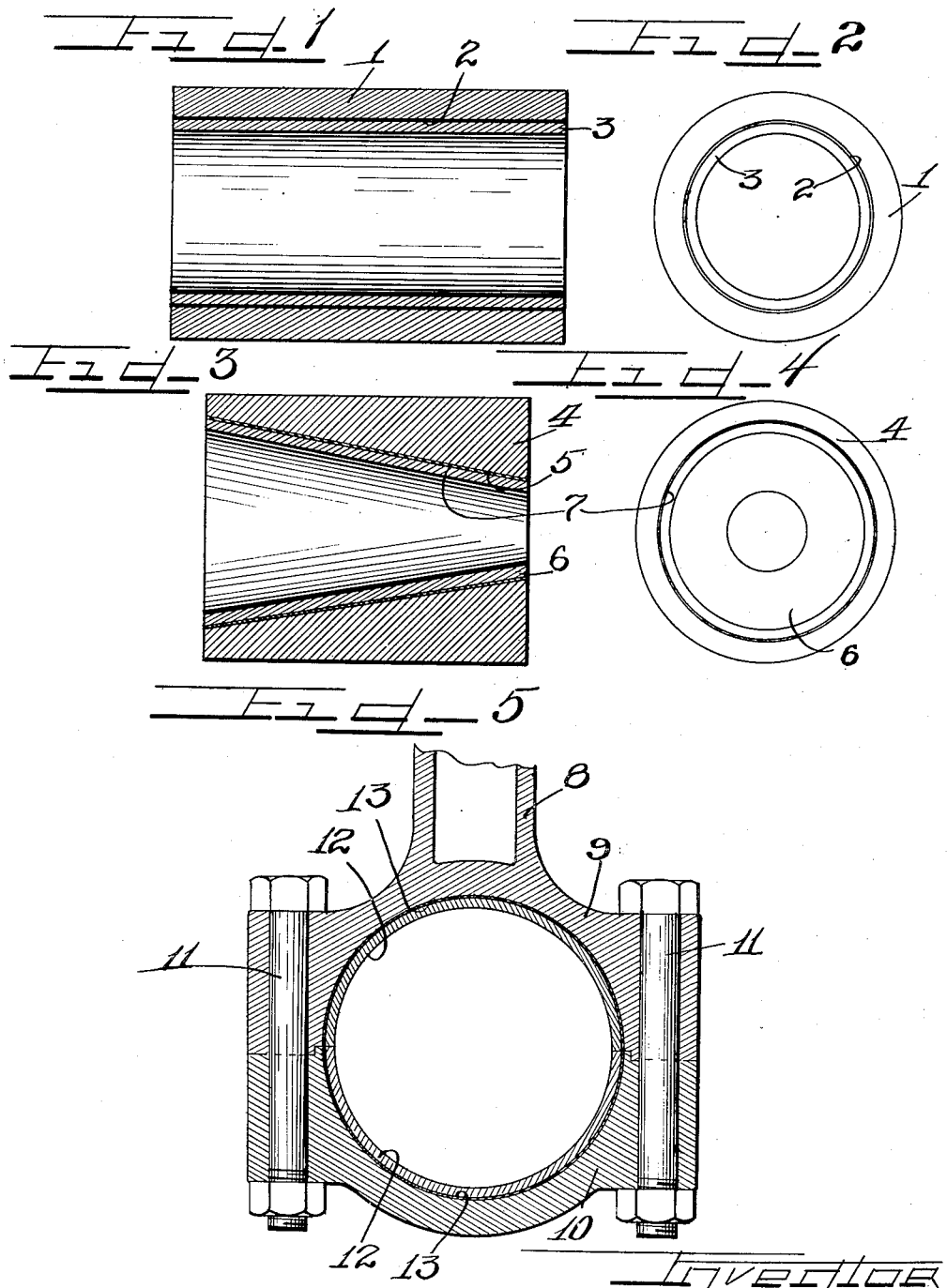

Patented Nov. 10, 1936

2,060,034

UNITED STATES PATENT OFFICE 2,060,034

BONDED METAL BEARINGS AND METHOD OF MAKING THE SAME

Milford G. Chandler, Flint, Mich., assignor to Marvel Carbureter Company, Flint, Mich., a corporation of Illinois Application June 22, 1933, Serial No. 677,043

6 Claims. (Cl. 29—149.5)

This invention relates to a method of bonding metals of different characteristics and has particular reference to a method of bonding aluminum and its alloys and similar metals to heavier metals and to the composite metal articles so produced.

Light metals, such as aluminum and its alloys have found acceptance in construction work of all kinds and, particularly, in automotive engines, due to their great strength and rigidity per unit weight. However, difficulty has been encountered in uniting aluminum and like metals to dissimilar heavier metals.

Other methods of uniting light metals or their alloys to dissimilar metals are known, but such methods have been found disadvantageous in commercial operation due to the specific conditions under which the uniting process must be carried out, and due to the fact that such methods are not of universal application.

It is an object of this invention to provide a method of uniting light metals to dissimilar metals which is of wide application and which provides a bond of maximum strength and continuity.

It is a further object of this invention to provide a method of uniting aluminum and its alloys to dissimilar metals, which insures a perfect bond between the metals.

It is a particular object of this invention to provide a method of uniting aluminum and its alloys to other metals which comprises tinning the surfaces of the metals and joining such surfaces under relatively low temperatures.

It is a further particular object of this invention to provide a method of bonding lead-bronze bearing members to aluminum housings.

It is a still further object of this invention to provide an aluminum bearing housing having a lead-bronze bushing firmly bonded therein.

These and other objects of this invention will be apparent from the following description and appended claims.

This invention (in a preferred form) is illustrated in the drawing and hereinafter more fully described.

On the drawing:

Figure 1 is a sectional view of a bearing member and housing formed in accordance with my invention.

Figure 2 is an end elevational view of the bearing of Fig. 1.

Figure 3 is a sectional view of a different form of bearing member.

Figure 4 is an end elevational view of Fig. 3.

Figure 5 is a sectional view illustrating the application of my invention to an automobile connecting rod bearing.

As shown on the drawing:

In Figs. 1 and 2 the reference numeral I indicates a housing or sleeve of aluminum or an alloy composed essentially of aluminum. Since my invention is particularly adapted for lining bearing housings, I shall describe it with reference thereto. In forming bearing members, an inner bushing 3, preferably formed of a heavier metal having suitable characteristics, is provided. Alloys consisting principally of copper and, in particular, a lead-bronze alloy consisting of approximately 75% copper, 20% lead and 5% tin have been found suitable.

The outer surface of the bushing 3 is thoroughly cleaned and a suitable flux is applied thereto. The bushing 3 is heated and a coating of tin is applied thereto at a temperature preferably below 300° C. so as to reduce oxidation to a minimum and to prevent sweating of lead if the bushing is of lead-bronze alloy. The bushing is then allowed to cool and is thoroughly washed and scoured to clean it.

The aluminum housing I is next cleaned, heated and tinned on its inner surface. In this operation a scratch brush is of assistance in removing oxides and in spreading the tin, which amalgamates with the clean aluminum or aluminum alloy.

After the surfaces of both the housing and bushing have been tinned, the members may be assembled. The bushing 3 is introduced into the housing I while the housing is hot and the housing is further heated to the melting point of the bonding metal, indicated at 2. This action causes the sleeves to bond together through the medium of the layer 2 of tin or tin alloy. Additional tin may be melted and flowed in from the ends if the parts are not fitted closely.

Although the bonding layer is referred to as being tin or as being composed principally of tin, it will be understood that the final bond may be largely an alloy of tin, such as an alloy of tin and aluminum.

Figs. 3 and 4 illustrate a different form of bearing member. In this case, the housing 4 is provided with a frusto-conical bore 5. The bushing 6 is frusto-conical in shape to fit the bore 5. The bonding layer 7 is formed between the two sleeves in the same manner as previously described except that in this case, axial pressure applied to the inner sleeve 6 produces sufficient radial pressure to bond the metals together.

Fig. 5 illustrates the application of my invention to a split bearing member. An aluminum automotive engine connecting rod is illustrated at 8. The rod 8 has a bearing housing comprising members 9 and 10 fastened together by bolts 11.

Each of the members 9 and 10 is provided with a concave cylindrical surface to which the bushings 12, 12 are united. The bushings 12, 12 are bonded to the housing by the method described above, a layer 13 of tin being formed between the bushings and the housing members.

Although I have mentioned tin as the bonding metal, it is to be understood that alloys consisting principally of tin will give similar results.

It is one of the particular advantages of my invention that the operations thereof can be carried out at a comparatively low temperature, the metals being heated to approximately 300° C. or below, at which temperature the tin will readily spread over the metals and upon cooling the tin will readily bond the metals together.

My invention affords an easy method of firmly bonding aluminum and its alloys to dissimilar metals. It can be used in the bonding of aluminum to copper, steel and other metals as well as to the alloy set out as an illustration in the foregoing description.

My invention produces a firm bond between the metals, which joint has a heat conductivity of close to 100% and which prevents leakage of liquids between the metals.

While I have described a method wherein the parts to be bonded are joined under pressure, which requires a smaller amount of tin at the joint, it should be noted that parts to be bonded may be tinned in accordance with my invention, placed in juxtaposition, and the bond completed without pressure by flowing molten tin between such prepared surfaces.

One of the important features of my method is the thorough cleansing of flux or other foreign matter from the tinned surface of the bronze or other dissimilar metal or alloy. This is accomplished by cooling and thoroughly washing the bronze member and then reheating it to the bonding temperature, pressing the parts together and allowing them to cool.

Many changes may be made in the particular arrangement of the steps and conditions of my process, and I do not wish to be limited otherwise than is necessary by the prior art and the scope of the appended claims.

I claim as my invention:

1. The method of constructing a bearing having an aluminum or aluminum base housing and a lead-bronze bushing, comprising the steps of cleaning the outer surface of the bushing, applying a flux thereto, tinning the same to form a tin-lead alloy coating and thoroughly washing and scouring the coated bushing, cleaning with a scratch brush the surface of the bearing housing to which the bushing is to be bonded and tinning the same without applying a flux thereto to form a tin aluminum alloy coating, inserting the bushing into the housing and heating the combined structure to bond together the two tin alloy coatings.

2. The method of constructing a bearing having an aluminum or aluminum alloy housing and a lead-bronze alloy bushing comprising the steps of cleaning the surfaces to be joined, applying a flux to the cleaned surface of the lead-bronze alloy only, tinning the surfaces of both metals to form a tin alloy coating thereon, placing the coated surfaces in contact and heating the same to a temperature not exceeding 300° C. to effect a bonding between the metals.

3. The method of constructing a bearing having a housing of aluminum or its alloys and a bushing of dissimilar heavier metals comprising the steps of cleaning the surface of the bushing, applying a flux thereto and tinning the same, cleaning the surface of the housing, tinning the same without applying a flux thereto to form an amalgam of tin and aluminum, placing the housing and the bushing with the coated surfaces in contact, and heating to a temperature just slightly above the melting point of the tin-aluminum amalgam.

4. The method of constructing a bearing having a housing of aluminum or its alloys and a bushing of dissimilar heavier metals comprising the steps of cleaning the surfaces of the metals to be united, applying to the surfaces a coating forming with the respective metals an amalgam having the same base, placing the metals with the coated surfaces in contact, and heating the metals to a temperature above the melting point of the amalgam coating formed on the metals.

5. The method of constructing a bearing having a housing of aluminum or its alloys and a bushing of dissimilar metals comprising the steps of cleaning the outer surface of the bushing, applying a flux thereto and tinning the same, cleaning the inner surface of the housing, tinning the same without applying a flux thereto to form a tin-aluminum alloy, placing the housing and the bushing with the coated surfaces in contact, and applying pressure thereto while they are heated.

6. A bearing comprising an aluminum or aluminum alloy housing and a lead-bronze bushing composed to a large extent of copper firmly united to the housing by a tin-aluminum alloy, bonding-layer composed principally of tin.

MILFORD G. CHANDLER.